(12) United States Patent
Chen et al.

(10) Patent No.: US 9,333,801 B2
(45) Date of Patent: *May 10, 2016

(54) CENTRAL CONTROL BRAKING SYSTEM

(71) Applicant: Shenzhen Mindray Bio-Medical Electronics Co., Ltd., Shenzhen (CN)

(72) Inventors: Xugui Chen, Shenzhen (CN); Min Hu, Shenzhen (CN); Mingzhao Zhou, Shenzhen (CN)

(73) Assignee: SHENZHEN MINDRAY BIO-MEDICAL ELECTRONICS CO., LTD., Shenzhen (CN)

( * ) Notice: Subject to any disclaimer, the term of this patent is extended or adjusted under 35 U.S.C. 154(b) by 137 days.

This patent is subject to a terminal disclaimer.

(21) Appl. No.: 14/092,389

(22) Filed: Nov. 27, 2013

(65) Prior Publication Data

US 2014/0083803 A1    Mar. 27, 2014

Related U.S. Application Data

(63) Continuation of application No. 13/252,048, filed on Oct. 3, 2011, now Pat. No. 8,640,832.

(30) Foreign Application Priority Data

Oct. 9, 2010   (CN) .......................... 2010 1 0501406

(51) Int. Cl.
*B60B 33/00* (2006.01)
*A61G 7/018* (2006.01)
(Continued)

(52) U.S. Cl.
CPC ............ *B60B 33/0092* (2013.01); *A61G 7/018* (2013.01); *A61G 7/1046* (2013.01);
(Continued)

(58) Field of Classification Search
CPC ............. B60B 33/021; B60B 2200/43; A61G 2007/0528; A61G 2203/36; A61G 7/018; A61G 1/0287
USPC ....... 188/1.12, 74, 250 R, 9, 10, 15; 16/18 R, 16/35 D, 45, 47; 5/600, 613, 617–19
See application file for complete search history.

(56) References Cited

U.S. PATENT DOCUMENTS 3,664,465 A * 5/1972 Holland .......................... 188/10
5,377,372 A * 1/1995 Rudolf et al. ..................... 5/600
(Continued)

FOREIGN PATENT DOCUMENTS

CN      2774449 Y     4/2006
CN    200985043 Y    12/2007
(Continued)

OTHER PUBLICATIONS

Office Action mailed Jul. 18, 2013 for U.S. Appl. No. 13/252,048.
(Continued)

*Primary Examiner* — Robert A Siconolfi
*Assistant Examiner* — Mahbubur Rashid
(74) *Attorney, Agent, or Firm* — Kory D. Christensen; Stoel Rives LLP

(57) ABSTRACT

A central control braking system includes: a pedestal; at least one caster mounted at a bottom portion of the pedestal; a brake transmission shaft for controlling the caster; a plate girder movably connected to the pedestal; a pedal fixed to the plate girder; and a reversing rotary assembly connecting the plate girder and the brake transmission shaft, wherein the reversing rotary assembly enables the brake transmission shaft to rotate in reverse under the control of the pedal.

11 Claims, 7 Drawing Sheets

(51) Int. Cl.
 *A61G 7/10* (2006.01)
 *A61G 13/10* (2006.01)
 *B62B 5/04* (2006.01)
 *A47L 9/00* (2006.01)
 *A61G 7/05* (2006.01)

(52) U.S. Cl.
 CPC ............ *A61G13/104* (2013.01); *B62B 5/0433* (2013.01); *A61G 2007/0528* (2013.01); *Y10T 16/18* (2015.01); *Y10T 16/184* (2015.01); *Y10T 16/1853* (2015.01); *Y10T 16/195* (2015.01); *Y10T 16/196* (2015.01)

(56) References Cited

U.S. PATENT DOCUMENTS

| | | | | |
|---|---|---|---|---|
| 5,450,639 | A * | 9/1995 | Weismiller et al. | 5/600 |
| 6,296,261 | B1 * | 10/2001 | deGoma | 280/47.34 |
| 7,216,877 | B1 * | 5/2007 | Frahm et al. | 280/79.11 |
| 7,302,717 | B2 * | 12/2007 | Reinke et al. | 5/86.1 |
| 8,640,832 | B2 | 2/2014 | Chen et al. | |
| 2008/0047065 | A1 | 2/2008 | He | |
| 2008/0120810 | A1 * | 5/2008 | Reckelhoff et al. | 16/35 R |

FOREIGN PATENT DOCUMENTS

| | | |
|---|---|---|
| CN | 201350183 Y | 11/2009 |
| CN | 201668618 U | 12/2010 |

OTHER PUBLICATIONS

Notice of Allowance mailed Oct. 30, 2013 for U.S. Appl. No. 13/252,048.

* cited by examiner

CENTRAL CONTROL BRAKING SYSTEM

CROSS-REFERENCE TO RELATED APPLICATIONS

This application is a continuation of U.S. patent application Ser. No. 13/252,048, titled CENTRAL CONTROL BRAKING SYSTEM, filed on Oct. 3, 2011, which claims the benefit of priority of Chinese Patent Application No. 201010501406.X, filed on Oct. 9, 2010, each of which is incorporated herein by reference in its entirety.

TECHNICAL FIELD

The present disclosure relates generally to medical equipment and, more particularly, to a central control braking system and cart-type movable medical equipment unit using the same.

SUMMARY OF THE INVENTION

A central control braking system includes: a pedestal; at least one caster mounted at a bottom portion of the pedestal; a brake transmission shaft for controlling the caster; a plate girder movably connected to the pedestal; a pedal fixed to the plate girder; and a reversing rotary assembly connecting the plate girder and the brake transmission shaft, wherein the reversing rotary assembly enables the brake transmission shaft to rotate in reverse under the control of the pedal.

DETAILED DESCRIPTION

Figure 1:
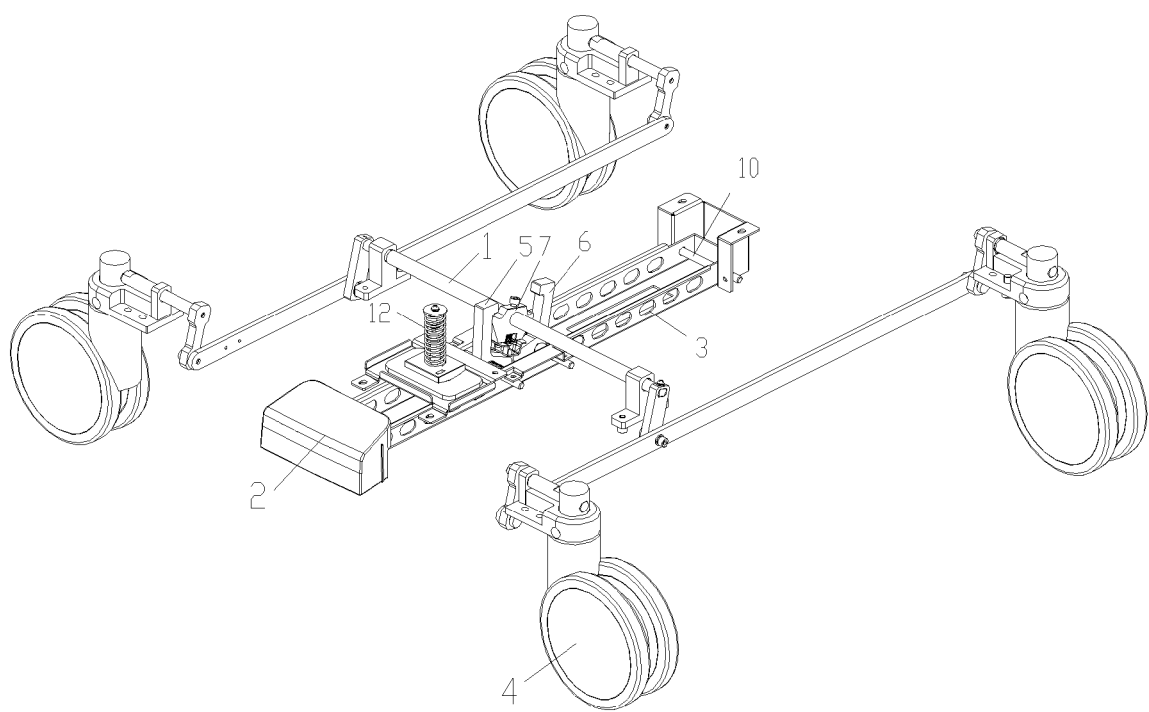
FIG. 1 is a perspective view of a central control braking system.

Movable medical devices, such as gurneys and carts, generally use a central control braking system. Distinct from a conventional braking system in which different braking mechanisms are used to respectively control different casters, a central control braking system uses one braking mechanism to control braking or brake releasing of multiple casters at the same time, making the system more convenient to operate.

Central control braking systems are typically of two varieties: dual-pedal braking systems and single-pedal braking systems. In dual-pedal braking systems, one pedal is used to control breaking of the casters, and the other pedal is used to control brake releasing of the casters. In single-pedal braking systems, braking and brake releasing of the casters are controlled through different operation modes of the same pedal. For example, the casters may be braked when the pedal is stepped on, and braking of the casters is released when the pedal is lifted.

For dual-pedal braking systems, the operator needs to use different pedals to respectively control braking and brake releasing of the casters. This configuration may confuse the operator and requires the operator to correctly distinguish between the pedal for braking and the pedal for brake releasing. In addition, such systems occupy a large space, which restricts the product design.

A variant of the dual-pedal braking system uses a lever structure to control rotation of the pedal shaft, and the operator can cause the pedal shaft to rotate in different directions by stepping on different ends of the pedal. Though this structure seems to have only one pedal, the structure is of the dual-pedal variety and is not conducive to man-machine interaction.

For single-pedal central control braking systems, braking and brake releasing of the casters are respectively controlled through stepping and lifting actions. Although this structure can avoid confusion of pedals, it is labor-intensive to lift the pedal. In addition, if the instep of the operator is not well protected, it may incur injury. Moreover, single-pedal central control braking systems still require the operator to determine whether to step on or lift the pedal, making them inconvenient to use.

The present disclosure provides a central control braking system that addresses the deficiencies of conventional approaches. In one embodiment, the system includes a pedestal, at least one caster mounted at a bottom portion of the pedestal, and a brake transmission shaft for controlling the caster. The system may further include a plate girder movably connected to the pedestal, a pedal fixed to the plate girder, and a reversing rotary assembly connecting the plate girder and the brake transmission shaft in which the reversing rotary assembly enables the brake transmission shaft to rotate in reverse under the control of the pedal.

One end of the plate girder may be rotatably connected to the pedestal, and the other end of the plate girder may be connected to the pedal. Alternatively, the plate girder and the pedestal may form a prismatic pair of vertical movement.

The reversing rotary assembly may include a first reversing hook, a second reversing hook movably connected to the plate girder, and a reversing wheel fixed to the brake transmission shaft and located between the first reversing hook and the second reversing hook. Under the control of the pedal, the first reversing hook or the second reversing hook may urge against the reversing wheel.

Under the control of the pedal, the reversing rotary assembly is alternately at a first relative position and a second relative position. The first reversing hook urges against the reversing wheel when the reversing rotary assembly is at the first relative position, and the second reversing hook urges against the reversing wheel when the reversing rotary assembly is at the second relative position.

At least one pedal resetting member may be further connected between the plate girder and the pedestal. After the pedal is released, the pedal resetting member may drive the pedal and the plate girder to reset, so that the reversing rotary assembly transits from the first relative position to the second relative position, or transits from the second relative position to the first relative position.

Rotation resetting members may be disposed between the first reversing hook and the plate girder and between the second reversing hook and the plate girder.

The first reversing hook and the second reversing hook may be respectively connected to the plate girder through a first pivot and a second pivot.

The upper end of the first reversing hook may be provided with a first engagement hook, the lower end of the first reversing hook may be provided with a first urging portion on the same side as the first engagement hook, the upper end of the second reversing hook may be provided with a second engagement hook, and the lower end of the second reversing hook may be provided with a second urging portion on the same side as the second engagement hook. In one embodiment, two ends of the top portion of the reversing wheel are respectively provided with a first engagement portion and a second engagement portion, and the bottom portion of the reversing wheel is provided with an extension rod. The extension rod may urge downward against the first urging portion when the reversing rotary assembly is at the first relative position, and the extension rod may urge downward against the second urging portion when the reversing rotary assembly is at the second relative position.

In one embodiment, the extension rod includes a first extension rod and a second extension rod respectively disposed at two ends of the bottom portion of the reversing wheel. The first extension rod may urge downward against the first urging portion when the reversing rotary assembly is at the first relative position, and the second extension rod may urge downward against the second urging portion when the reversing rotary assembly is at the second relative position.

In some configurations, the reversing wheel further includes a wheel body, the extension rod includes a pin and a spring sleeved over the pin, and the bottom end of the pin is formed with a flange. The pin extends out of the bottom portion of the wheel body, and the spring is clamped between the flange and the bottom portion of the wheel body.

The present disclosure may further include cart-type movable medical equipment that includes the central control braking system described above.

Using the foregoing system, an operator can control braking or brake releasing of the caster by simply stepping on the pedal, which is more convenient, reduces labor, and will not injure the instep.

Figure 2:
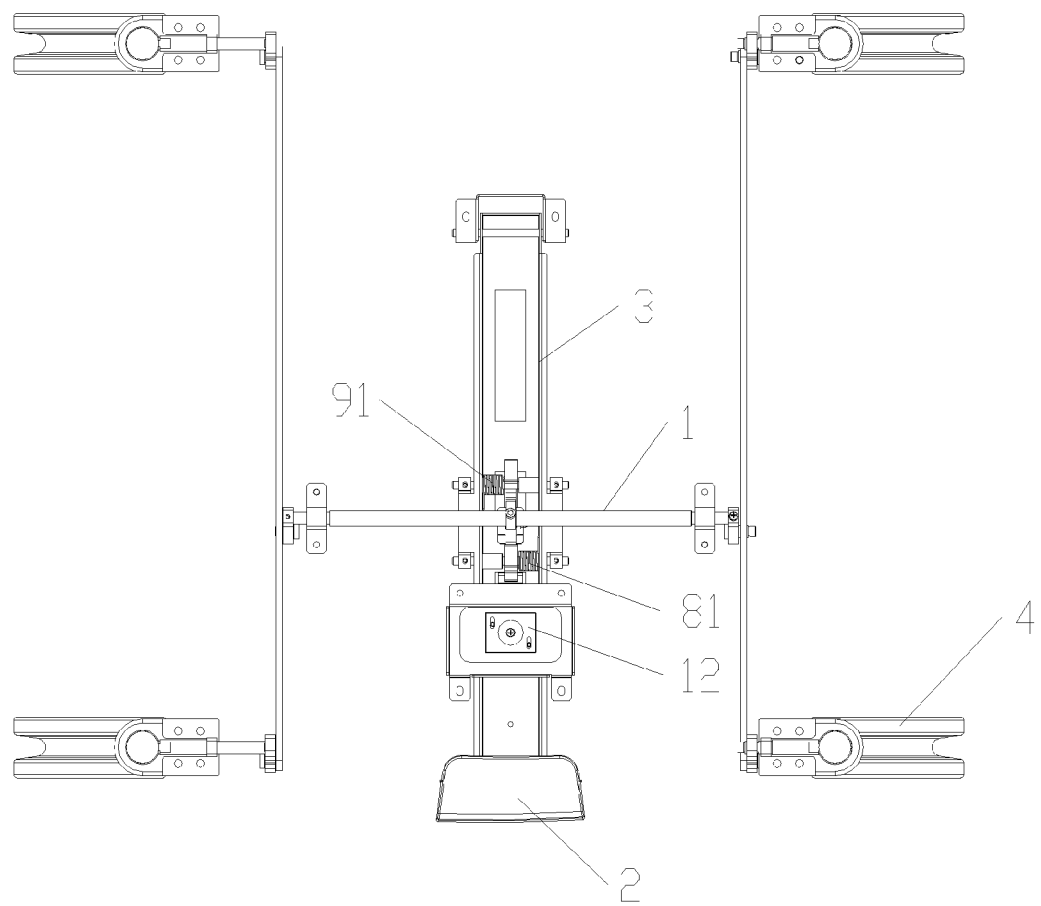
FIG. 2 is a top view of a central control braking system.
Figure 3:
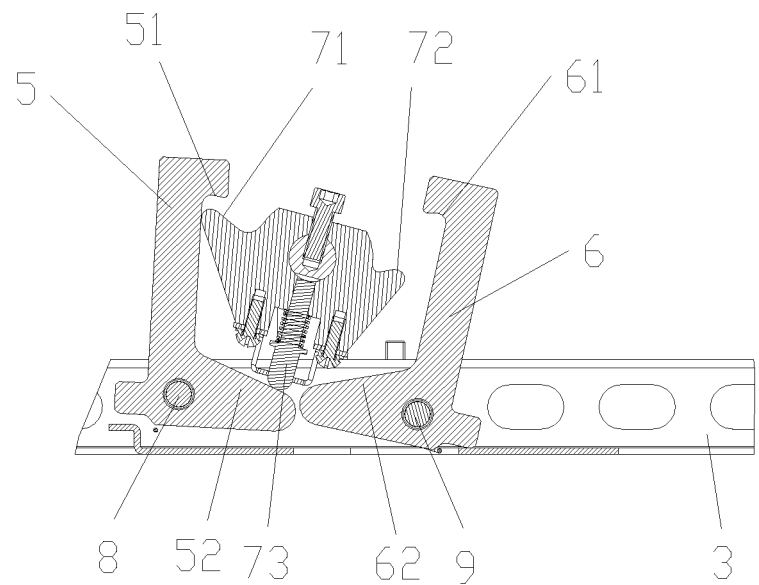
FIG. 3 is an enlarged schematic view of a reversing rotary assembly at a first relative position.

Referring to FIGS. 1-3, one embodiment of a central control braking system may include a pedestal (not shown), a caster 4, a brake transmission shaft 1, a plate girder 3, a pedal 2, and a reversing rotary assembly. The pedestal is connected to a cart body. The plate girder 3 and the caster 4 are mounted at a bottom portion of the pedestal. The plate girder 3 is movably connected to the pedestal. The pedal 2 is fixed to the plate girder 3. The reversing rotary assembly connects the plate girder 3 and the brake transmission shaft 1, and is used for enabling the brake transmission shaft 1 to rotate in reverse under the control of the pedal 2. One or more casters 4 may be provided. The brake transmission shaft 1 is connected to the caster 4 by a rod structure, so that when the brake transmission shaft 1 is driven by the reversing rotary assembly to rotate forward or in reverse, the brake transmission shaft 1 respectively controls braking or brake releasing of the caster 4.

In one embodiment, the reversing rotary assembly includes a reversing wheel 7, a first reversing hook 5, and a second reversing hook 6. The first reversing hook 5 and the second reversing hook 6 are movably connected to the plate girder 3. The reversing wheel 7 is fixed to the brake transmission shaft 1 and located between the first reversing hook 5 and the second reversing hook 6. Under the control of the pedal 2, the first reversing hook 5 or the second reversing hook 6 urges against the reversing wheel 7.

The reversing rotary assembly, driven by the pedal 2, is alternately at a first relative position and a second relative position. The first reversing hook 5 urges against the reversing wheel 7 when the reversing rotary assembly is at the first relative position, and the first reversing hook 5 rotates in synchronization with the reversing wheel 7 when the reversing rotary assembly transits from the first relative position to the second relative position. The second reversing hook 6 urges against the reversing wheel 7 when the reversing rotary assembly is at the second relative position, and the second reversing hook 6 rotates in synchronization with the reversing wheel 7 when the reversing rotary assembly transits from the second relative position to the first relative position.

The two different relative positions correspond to different working states of the central control braking system, i.e., a brake locked state or a brake-release locked state. For example, when the first relative position corresponds to the brake locked state and the second relative position corresponds to the brake-release locked state, the transition of the reversing rotary assembly from the first relative position to the second relative position achieves a brake release action, and the transition of the reversing rotary assembly from the second relative position to the first relative position achieves a brake action.

A pedal resetting member 12 is further connected between the plate girder 3 and the pedestal. When an operator steps on the pedal 2, the pedal 2 is forced to move downward a distance, and the plate girder 3 as a whole moves downward relative to the pedestal until the pedal 2 is stopped by the pedestal and cannot continue to move. When the pedal 2 is released, the pedal resetting member 12 drives the pedal 2 and the plate girder 3 back to initial positions before the pedal 2 is stepped on, so that the reversing rotary assembly transits from the first relative position to the second relative position, or transits from the second relative position to the first relative position.

Figure 4:
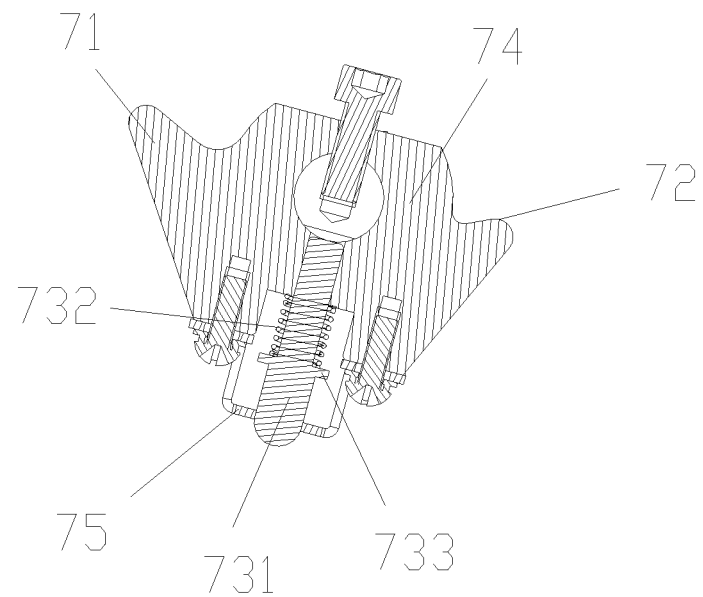
FIG. 4 is a schematic view of a reversing wheel.

In another embodiment, as shown in FIGS. 3-4, the upper end of the first reversing hook 5 is provided with a first engagement hook 51, the lower end of the first reversing hook 5 is provided with a first urging portion 52 on the same side as the first engagement hook 51, and correspondingly, the upper end of the second reversing hook 6 is provided with a second engagement hook 61, and the lower end of the second reversing hook 6 is provided with a second urging portion 62 on the same side as the second engagement hook 61. Two ends of the top portion of the reversing wheel 7 are respectively provided with a first engagement portion 71 and a second engagement portion 72, and the bottom portion of the reversing wheel 7 is provided with an extension rod 73.

Before the operator steps on the pedal 2, the reversing rotary assembly is at the first relative position, and the extension rod 73 urges downward against the first urging portion 52. When the operator steps on the pedal 2 to force the pedal 2 to move downward a distance, the first engagement hook 51 of the first reversing hook 5 engages with and rotates in synchronization with the first engagement portion 71 of the reversing wheel 7.

After the operator releases the pedal 2, the pedal 2 and the plate girder 3 are reset under the action of the pedal resetting member 12, so that the extension rod 73 shifts from being on the first urging portion 52 to being on the second urging portion 62, and the reversing rotary assembly transits from the first relative position to the second relative position. When the reversing rotary assembly is at the second relative position, the extension rod 73 urges downward against the second urging portion 62.

When the operator steps on the pedal 2 again to force the pedal 2 to move downward a distance, the second engagement hook 61 of the second reversing hook 6 engages with and rotates in synchronization with the second engagement portion 72 of the reversing wheel 7. After the operator releases the pedal 2, the pedal 2 and the plate girder 3 reset under the action of the pedal resetting member 12, so that the extension rod 73 shifts from being on the second urging portion 62 to being on the first urging portion 52, and, accordingly, the reversing rotary assembly transits from the second relative position to the first relative position.

The reversing wheel 7 of this embodiment further includes a wheel body 74. The first engagement portion 71 and the second engagement portion 72 may be respectively located at two ends of the top portion of the wheel body 74. The extension rod 73 includes a pin 731 and a spring 732 sleeved over the pin 731. The pin 731 may pass through a through hole in the wheel body 74 to be fixed. The upper and lower ends of the pin 731 may respectively extend out of the top portion and the bottom portion of the wheel body 74. A bottom end of the pin 731 is further formed with a flange 733, and the spring 732 is clamped between the flange 733 and the bottom portion of the wheel body 74.

When the reversing wheel 7 urges against the first reversing hook 5 or the second reversing hook 6, or rotates in synchronization with the first reversing hook 5 or the second reversing hook 6, the spring 732 undergoes compressive deformation and thus exerts a downward force on the pin 731, so that the reversing wheel 7 does not easily depart from the first reversing hook 5 or the second reversing hook 6 before engagement with the first reversing hook 5 or the second reversing hook 6. Further, to prevent displacement of the pin 731 during extension/retraction, a guide plate 75 is further fixed at the bottom portion of the wheel body 74, a guide hole is formed in the guide plate 75, and a portion of the pin 731 below the flange 733 extends out of the guide hole.

One or more extension rods 73 may be provided. For example, a first extension rod and a second extension rod may be respectively disposed at the two ends of the bottom portion of the reversing wheel 7. The first extension rod urges downward against the first urging portion 52 when the reversing rotary assembly is at the first relative position, and the second extension rod urges downward against the second urging portion 62 when the reversing rotary assembly is at the second relative position.

Figure 5:
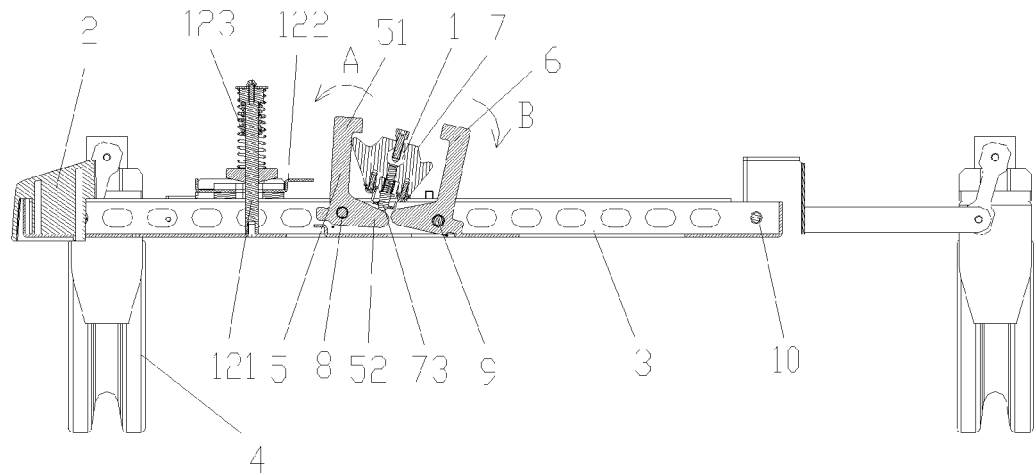
FIG. 5 is a schematic cross-sectional view of a reversing rotary assembly at a first relative position.

Referring to FIG. 5, the first reversing hook 5 and the second reversing hook 6 may be respectively connected to the plate girder 3 through a first pivot 8 and a second pivot 9. Rotation resetting members may be disposed between the first reversing hook 5 and the plate girder 3 and between the second reversing hook 6 and the plate girder 3, so as to enable the first reversing hook 5 to rotate in a direction of departure from the reversing wheel 7 when not engaging with the reversing wheel 7, e.g., driving the first reversing hook 5 to rotate along the arrow A and driving the second reversing hook 6 to rotate along the arrow B.

Figure 11:
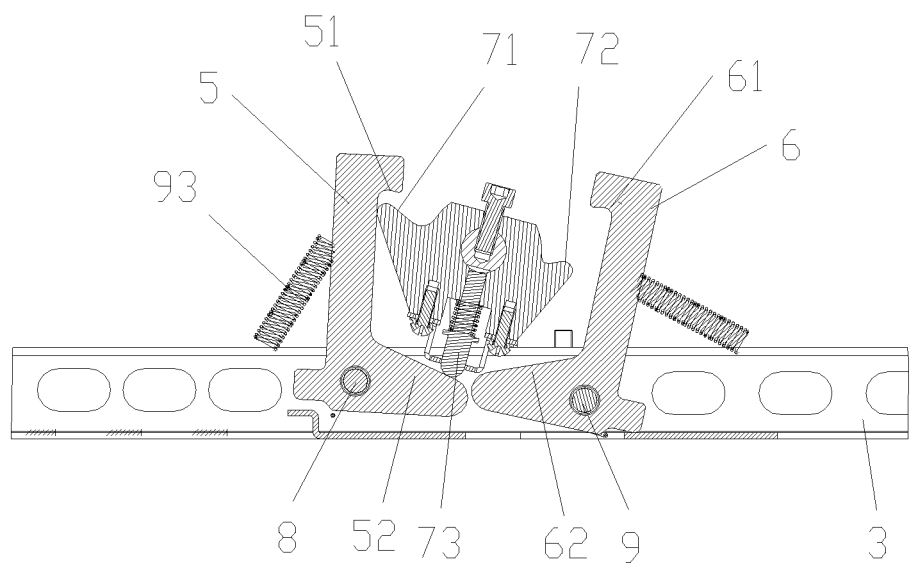
FIG. 11 is a schematic view of a reversing rotary assembly.

The rotation resetting members may be a first torsion spring 81 sleeved over the first pivot 8 and a second torsion spring 91 sleeved over the second pivot 9 (as shown in FIG. 2), or may be embodied in other configurations. For example, the rotation resetting member may be a spring 93, as shown in FIG. 11, with one end connected to an outer side of the first reversing hook 5 or the second reversing hook 6, and the other end connected to the plate girder 3. When the first reversing hook 5 or the second reversing hook 6 engages with the reversing wheel 7, the spring 93 is in a tension state, and when the reversing wheel 7 shifts to be on one reversing hook, the other reversing hook rotates in a direction of departure from the reversing wheel 7 under a pulling force of the spring 93. Alternatively, the rotation resetting member may be a plumb bob disposed on the first reversing hook 5 or the second reversing hook 6 to drive the first reversing hook 5 or the second reversing hook 6 to rotate under the action of gravity.

The central control braking system of this embodiment realizes single-pedal braking, so that the operator can control braking or brake releasing of the caster 4 by simply stepping on the pedal 2, which requires less effort and will not injure the instep.

The connection methods of the plate girder 3 and the pedestal, as well as the positions of the pedal 2, the first reversing hook 5, and the second reversing hook 6 on the plate girder 3, may be configured as required. In the embodiment shown in FIG. 5, one end of the plate girder 3 is rotatably connected to the pedestal through a pedestal shaft 10, the other end of the plate girder 3 is fixed to the pedal 2, and the first reversing hook 5 and the second reversing hook 6 are rotatably connected to the middle portion of the plate girder 3. As the plate girder 3 is relatively long, when the operator steps on the pedal 2, the whole plate girder 3 drives the reversing wheel 7 to rotate by a particular angle through the first reversing hook 5 or the second reversing hook 6, so as to enable the pedal 2 to move downward a long distance, thereby achieving transition of the reversing rotary assembly to different states. As a result, the movement of the pedal 2 approximates a straight line, and compared with the oblique movement of the pedal 2 during braking or brake releasing processes in conventional systems, the disclosed embodiment more conveniently allows the operator to exert a force with a foot.

Figure 12:
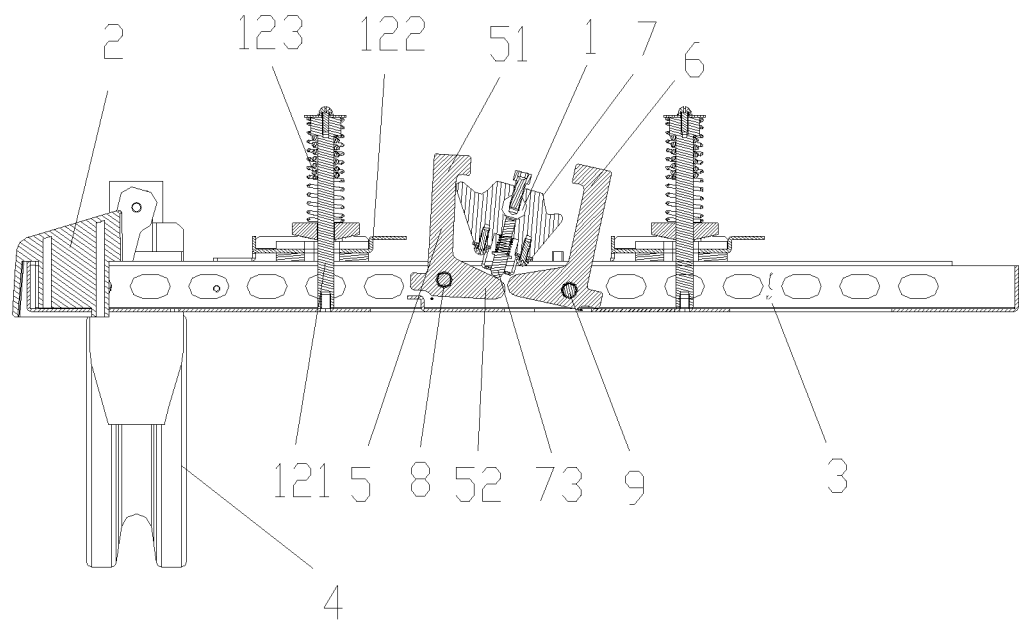
FIG. 12 is a schematic cross-sectional view of a reversing rotary assembly at a first relative position.

In another embodiment, as shown in FIG. 12, the plate girder 3 and the pedestal form a prismatic pair of vertical movement. For example, the plate girder 3 may be connected to the bottom portion of the pedestal by using two pull rods disposed at the two ends of the plate girder 3 or by using one pull plate located at the middle portion of the plate girder 3. When the operator steps on the pedal 2, the plate girder 3 is driven to move downward vertically relative to the pedestal. To ensure the stability of movement, two vertically extending guide rails may be further disposed on the pedestal, so that the plate girder 3 can move stably along the guide rails. In addition, a stop portion is disposed on the guide rails to limit the vertical movement of the plate girder 3. In this embodiment, the pedal 2 may be fixed to the end portion or the middle portion of the plate girder 3, and in order to achieve effective resetting of the plate girder 3 and the pedal 2, a pedal resetting member 12 may be disposed on the plate girder 3 at positions on two sides of the reversing rotary assembly. In this embodiment, when the operator steps on the pedal 2, the movement of the pedal 2 is a straight line, which results in a more ergonomic operation.

The pedal resetting member 12 may use a reset spring 123 connected to the pedestal. Each time the pedal 2 is stepped on, the reset spring 123 is tensioned, and after the pedal 2 is released, the reset spring 123 drives the pedal 2 and the plate girder 3 to reset, so that the reversing rotary assembly transits between the first relative position and the second relative position. In one embodiment, the pedal resetting member 12 includes a reset lever 121, a stop plate 122 with a through hole, and a reset spring 123. The stop plate 122 is fixed to the pedestal, the bottom end of the reset lever 121 runs through the through hole in the stop plate 122 and is fixed to the plate girder 3, and the reset spring 123 is sleeved over the reset lever 121 and connected between the top end of the reset lever 121 and the stop plate 122. In this embodiment, each time the pedal 2 is stepped on, the reset spring is compressed between the reset lever 121 and the stop plate 122, and after the pedal 2 is released, the reset spring 123 drives the plate girder 3 to reset, so that the reversing rotary assembly transits between the first relative position and the second relative position.

Figure 6:
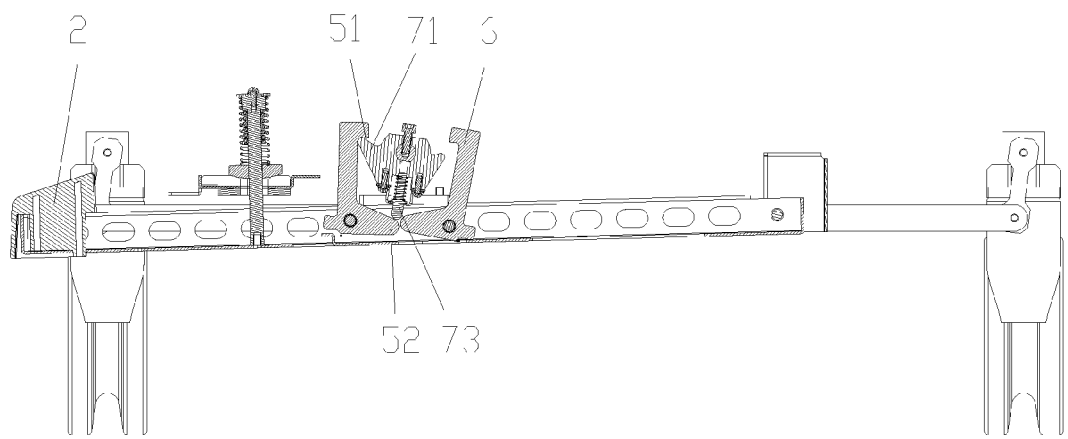
FIG. 6 is a schematic cross-sectional view of a state of a reversing rotary assembly transiting from a first relative position to a second relative position.

A method of operation of the central control braking system is now described in connection with FIGS. 5-10. When the reversing rotary assembly is at the first relative position, the extension rod 73 of the reversing wheel 7 urges against the first urging portion 52 of the first reversing hook 5. As shown in FIG. 6, when the operator steps on the pedal 2 to force the pedal 2 to move downward a distance, the plate girder 3 rotates around the pedestal shaft 10 and drives the first reversing hook 5 to move downward, so that the first engagement hook 51 engages with and rotates in synchronization with the first engagement portion 71 of the reversing wheel 7. This drives the brake transmission shaft 1 to rotate to control braking of the caster 4.

Figure 7:
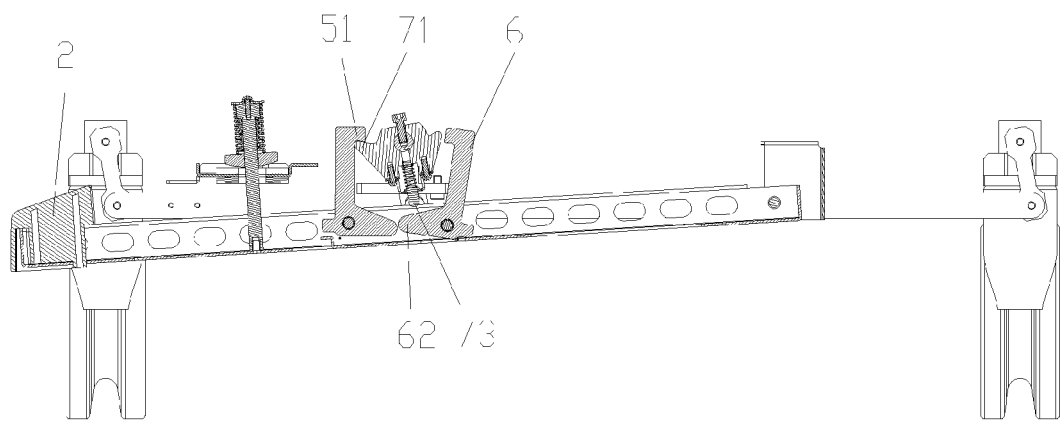
FIG. 7 is a schematic cross-sectional view of another state of a reversing rotary assembly transiting from a first relative position to a second relative position.
Figure 8:
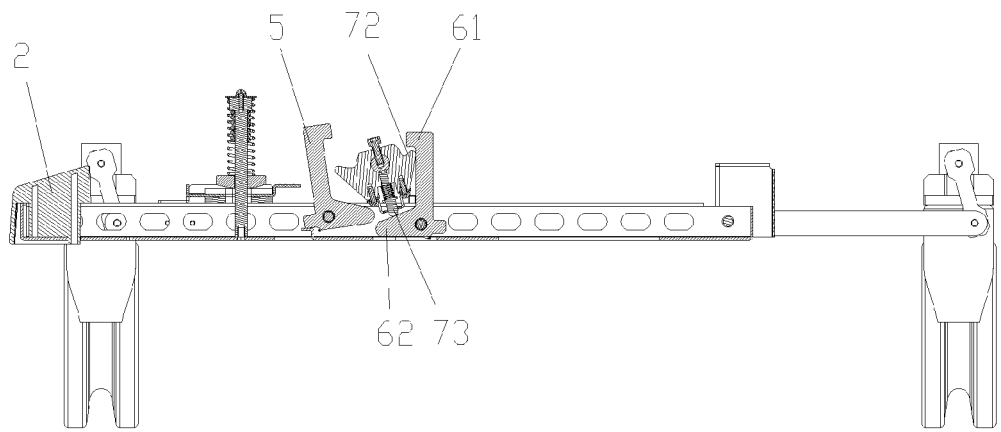
FIG. 8 is a schematic cross-sectional view of a reversing rotary assembly at a second relative position.

As shown in FIG. 7, when the pedal 2 is stepped on to the maximum extent, the extension rod 73 shifts to be on the second urging portion 62 of the second reversing hook 6, and the first reversing hook 5 resets under the action of the rotation resetting member. After the operator releases the pedal 2, the plate girder 3 resets under the action of the pedal resetting member 12, and the extension rod 73 still urges against the second urging portion 62 of the second reversing hook 6, and the reversing rotary assembly transits to the second relative position shown in FIG. 8.

Figure 9:
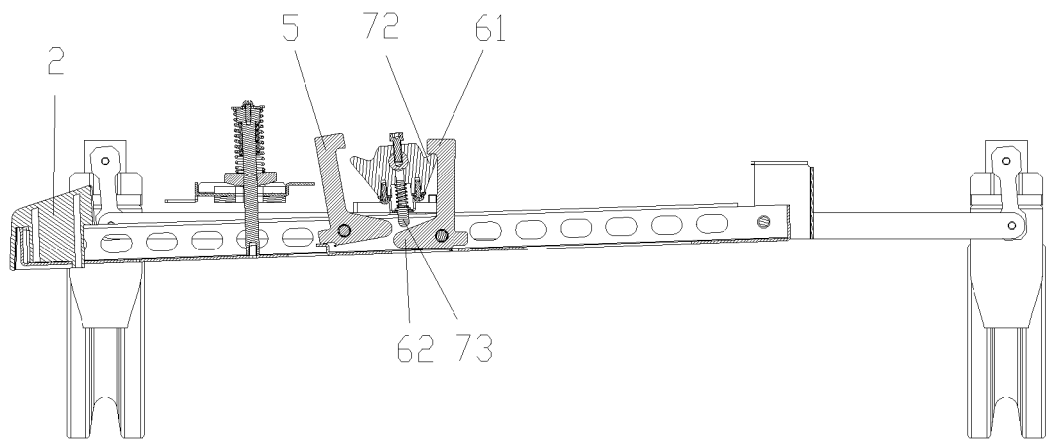
FIG. 9 is a schematic cross-sectional view of a state of a reversing rotary assembly transiting from a second relative position to a first relative position.

As shown in FIG. 9, when the operator steps on the pedal 2 again, the plate girder 3 rotates around the pedestal shaft 10 and drives the second reversing hook 6 to move downward, so that the second engagement hook 61 engages with and rotates in synchronization with the second engagement portion 72 of the reversing wheel 7. This drives the brake transmission shaft 1 to rotate in reverse to control brake releasing of the caster 4.

Figure 10:
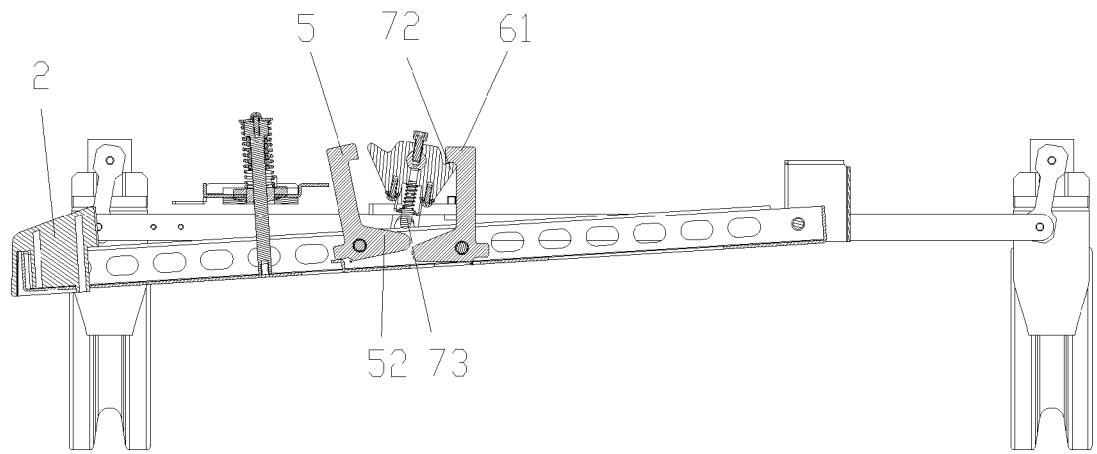
FIG. 10 is a schematic cross-sectional view of another state of a reversing rotary assembly transiting from a second relative position to a first relative position.

As shown in FIG. 10, when the pedal 2 is stepped on to the maximum extent, the extension rod 73 shifts to be on the first urging portion 52 of the first reversing hook 5, and the second reversing hook 6 resets under the action of the rotation resetting member. After the operator releases the pedal 2, the plate girder 3 resets under the action of the pedal resetting member 12, the extension rod 73 still urges against the second urging portion 62 of the second reversing hook 6, and the reversing rotary assembly transits to the first relative position shown in FIG. 5.

The central control braking system provided by this embodiment may be widely applied to cart-type movable medical equipment using pedal brakes, such as an anesthesia machine and a breathing machine.

Although the invention is described above in detail through specific embodiments, the invention is not limited to the specific embodiments. It should be understood by persons of ordinary skill in the art that any simple modifications may be made without departing from the spirit and scope of the invention.

What is claimed is:

1. A central control braking system, comprising:
a pedestal;
at least one caster mounted at a bottom portion of the pedestal;
a brake transmission shaft for controlling the caster;
a plate girder movably connected to the pedestal;
a pedal fixed to the plate girder, wherein when the pedal is depressed, the plate girder moves downward relative to the pedestal; and
a reversing rotary assembly connecting the plate girder and the brake transmission shaft, wherein the reversing rotary assembly enables the brake transmission shaft to rotate forward or in reverse, based on a position of the reversing rotary assembly, when the pedal is depressed;
wherein the reversing rotary assembly comprises a first reversing hook and a second reversing hook movably connected to the plate girder and a reversing wheel fixed to the brake transmission shaft and located between the first reversing hook and the second reversing hook; and
wherein, under the control of the pedal, the first reversing hook or the second reversing hook urges against the reversing wheel.

2. The system according to claim 1, wherein one end of the plate girder is rotatably connected to the pedestal, and the other end of the plate girder is connected to the pedal.

3. The system according to claim 1, wherein the plate girder and the pedestal form a prismatic pair of vertical movement.

4. The system according to claim 1, wherein, under the control of the pedal, the reversing rotary assembly is alternately at a first relative position and a second relative position, the first reversing hook urging against the reversing wheel when the reversing rotary assembly is at the first relative position, and the second reversing hook urging against the reversing wheel when the reversing rotary assembly is at the second relative position.

5. The system according to claim 4, wherein at least one pedal resetting member is further connected between the plate girder and the pedestal; and wherein, after the pedal is released, the pedal resetting member drives the pedal and the plate girder to reset, so that the reversing rotary assembly transits from the first relative position to the second relative position or transits from the second relative position to the first relative position.

6. The system according to claim 1, wherein one or more rotation resetting members are disposed between the first reversing hook and the plate girder and between the second reversing hook and the plate girder.

7. The system according to claim 1, wherein the first reversing hook and the second reversing hook are respectively connected to the plate girder through a first pivot and a second pivot.

8. The system according to claim 1, wherein an upper end of the first reversing hook is provided with a first engagement hook, a lower end of the first reversing hook is provided with a first urging portion on the same side as the first engagement hook, an upper end of the second reversing hook is provided with a second engagement hook, and a lower end of the second reversing hook is provided with a second urging portion on the same side as the second engagement hook; wherein two ends of the top portion of the reversing wheel are respectively provided with a first engagement portion and a second engagement portion; wherein the bottom portion of the reversing wheel is provided with an extension rod; and wherein the extension rod urges downward against the first urging portion when the reversing rotary assembly is at the first relative position, and the extension rod urges downward against the second urging portion when the reversing rotary assembly is at the second relative position.

9. The system according to claim 8, wherein the extension rod comprises a first extension rod and a second extension rod respectively disposed at two ends of the bottom portion of the reversing wheel, the first extension rod urging downward against the first urging portion when the reversing rotary assembly is at the first relative position, and the second extension rod urging downward against the second urging portion when the reversing rotary assembly is at the second relative position.

10. The system according to claim 8, wherein the reversing wheel further comprises a wheel body, the extension rod comprising a pin and a spring sleeved over the pin, the bottom end of the pin being formed with a flange; and wherein the pin extends out of the bottom portion of the wheel body, and the spring is clamped between the flange and the bottom portion of the wheel body.

11. A movable medical equipment unit comprising:
   a central control braking system comprising:
      a pedestal;
      at least one caster mounted at a bottom portion of the pedestal;
      a brake transmission shaft for controlling the caster;
      a plate girder movably connected to the pedestal;
      a pedal fixed to the plate girder, wherein when the pedal is depressed, the plate girder moves downward relative to the pedestal; and
      a reversing rotary assembly connecting the plate girder and the brake transmission shaft, wherein the reversing rotary assembly enables the brake transmission shaft to rotate in reverse under the control of the pedal;
   wherein the reversing rotary assembly comprises a first reversing hook and a second reversing hook movably connected to the plate girder and a reversing wheel fixed to the brake transmission shaft and located between the first reversing hook and the second reversing hook; and wherein, under the control of the pedal, the first reversing hook or the second reversing hook urges against the reversing wheel.

* * * * *